US012722482B2

(12) United States Patent
Nessler et al.

(10) Patent No.: US 12,722,482 B2
(45) Date of Patent: Sep. 1, 2026

(54) VEHICLE CONTROL APPARATUS

(71) Applicant: Honda Motor Co., Ltd., Tokyo (JP)

(72) Inventors: Jens Nessler, Offenbach/Am Main (DE); Marcus Kleinehagenbrock, Offenbach/Am Main (DE)

(73) Assignee: Honda Motor Co., Ltd., Tokyo (JP)

( * ) Notice: Subject to any disclaimer, the term of this patent is extended or adjusted under 35 U.S.C. 154(b) by 64 days.

(21) Appl. No.: 18/892,716

(22) Filed: Sep. 23, 2024

(65) Prior Publication Data

US 2025/0108688 A1 Apr. 3, 2025

(30) Foreign Application Priority Data

Sep. 29, 2023 (JP) ................................ 2023-169378

(51) Int. Cl.
*B60K 31/00* (2006.01)
*G06V 20/56* (2022.01)
(Continued)

(52) U.S. Cl.
CPC ........ *B60K 31/0066* (2013.01); *G06V 20/582* (2022.01); *G06V 20/588* (2022.01); *B60W 30/143* (2013.01)

(58) Field of Classification Search
CPC ............ B60K 31/0066; B60W 30/143; B60W 2552/15; B60W 2552/30; B60W 2552/53;
(Continued)

(56) References Cited

U.S. PATENT DOCUMENTS

2014/0324268 A1* 10/2014 Montemerlo ..... B60W 60/0013 701/25
2018/0174371 A1* 6/2018 Um ........................ G07B 15/06
(Continued)

FOREIGN PATENT DOCUMENTS

| | | | |
|---|---|---|---|
| JP | 2004347470 | A | 12/2004 |
| JP | 2005128790 | A | 5/2005 |
| JP | 2023078605 | A | 6/2023 |

OTHER PUBLICATIONS

"How To Merge Onto A Highway or Interstate (Driving Tutorial)" published by DrivingTV; video release date was Jul. 28, 2020; URL is https://www.youtube.com/watch?v=giPtbdl1YLw (Year: 2020).*
(Continued)

*Primary Examiner* — Calvin Cheung
(74) *Attorney, Agent, or Firm* — Duft & Bornsen, PC

(57) ABSTRACT

A vehicle control apparatus includes an actuator used for traveling and a microprocessor. The microprocessor is configured to perform: recognizing a road traffic sign installed on a driving path of a subject vehicle and a curved road based on a curvature of the driving path on a forward side in an advancing direction; and setting a target driving speed of the subject vehicle on the driving path. The setting includes, when the curved road and the road traffic sign is recognized on the curved road while the subject vehicle is traveling in a merging lane, setting the target driving speed to a first target driving speed which is based on the road traffic sign, and when the subject vehicle enters the main, setting the target driving speed to a second target driving speed different from the first target driving speed.

6 Claims, 7 Drawing Sheets

(51) Int. Cl.
*G06V 20/58* (2022.01)
*B60W 30/14* (2006.01)

(58) Field of Classification Search
CPC ......... B60W 2555/60; B60W 2720/10; B60W 30/18145; B60W 40/072; G06V 20/582; G06V 20/588
See application file for complete search history.

(56) References Cited

U.S. PATENT DOCUMENTS

| | | | | |
|---|---|---|---|---|
| 2019/0272389 | A1* | 9/2019 | Viente | G06F 21/6254 |
| 2020/0348669 | A1* | 11/2020 | Kim | E05F 15/73 |
| 2021/0370933 | A1* | 12/2021 | Zhang | B60W 30/0956 |
| 2022/0290995 | A1* | 9/2022 | Zhang | G01C 21/3697 |
| 2023/0169779 | A1 | 6/2023 | Nessler et al. | |

OTHER PUBLICATIONS

Japanese Office action; Application 2023-169378; 11 pages; Mar. 25, 2025.

* cited by examiner

FIG. 6

VEHICLE CONTROL APPARATUS

CROSS-REFERENCE TO RELATED APPLICATION

This application is based upon and claims the benefit of priority from Japanese Patent Application No. 2023-169378 filed on Sep. 29, 2023, the content of which is incorporated herein by reference.

BACKGROUND

Technical Field

The present invention relates to a vehicle control apparatus configured to control traveling of a vehicle, especially control the traveling at a point where a merging lane merges into a main lane.

Related Art

Conventionally, there is a known apparatus configured to control a vehicle speed based on an indicated road sign and road surface sign, for example, JP2005-128790A. In the apparatus described in JP2005-128790A, the speed limit indicated by the road sign and road surface sign is recognized based on an image obtained by capturing the space ahead of the vehicle, and the vehicle speed is controlled based on the recognized speed limit.

However, when a road sign is installed near a merging point where a merging lane merges into a main lane such a highway, it is difficult to determine whether or not the road sign corresponds to the main lane based on the captured image. Therefore, if an apparatus merely recognizes the information of the road sign based on the captured image, such as JP2005-128790A, it may not be able to properly control the vehicle speed at or after the merging point.

SUMMARY

An aspect of the present invention is a vehicle control apparatus including: an actuator used for traveling; and a microprocessor. The microprocessor is configured to perform: recognizing a road traffic sign installed on a forward side in an advancing direction in association with a driving path of a subject vehicle, and a curvature of the driving path on the forward side in the advancing direction; setting a target driving speed of the subject vehicle on the driving path; and controlling the actuator for the subject vehicle to travel at the target driving speed. The microprocessor is configured to perform: the recognizing including further recognizing a curved road based on the curvature of the driving path base on the curvature of the driving path; and the setting including, when the curved road and the road traffic sign on the curved road are recognized while the subject vehicle is traveling in a merging lane to merge into a main lane, setting the target driving speed to a first target driving speed which is based on the road traffic sign, and sets, when the subject vehicle enters the main lane, the target driving speed to a second target driving speed different from the first target driving speed.

BRIEF DESCRIPTION OF THE DRAWINGS

The objects, features, and advantages of the present invention will become clearer from the following description of embodiments in relation to the attached drawings, in which:

FIG. 6 is a flowchart illustrating an example of processing performed by the controller in FIG. 1.

DETAILED DESCRIPTION

A description will be given below of an embodiment of the present invention with reference to FIGS. 1 to 7. A vehicle control apparatus according to the embodiment of the present invention can be applied to a vehicle having a self-driving capability, that is, an automated vehicle. A vehicle to which the vehicle control apparatus according to the present embodiment is applied may be sometimes called a subject vehicle by distinguishing it from other vehicles. The subject vehicle may be any of an engine vehicle having an internal combustion engine as a travel drive source, an electric vehicle having an electric motor as a travel drive source, and a hybrid vehicle having a combustion engine and an electric motor as a travel drive source. The subject vehicle can not only travel in the automated driving mode where driving operation by a driver is unnecessary, but also travel in the manual driving mode by driving operation of the driver.

Figure 1:
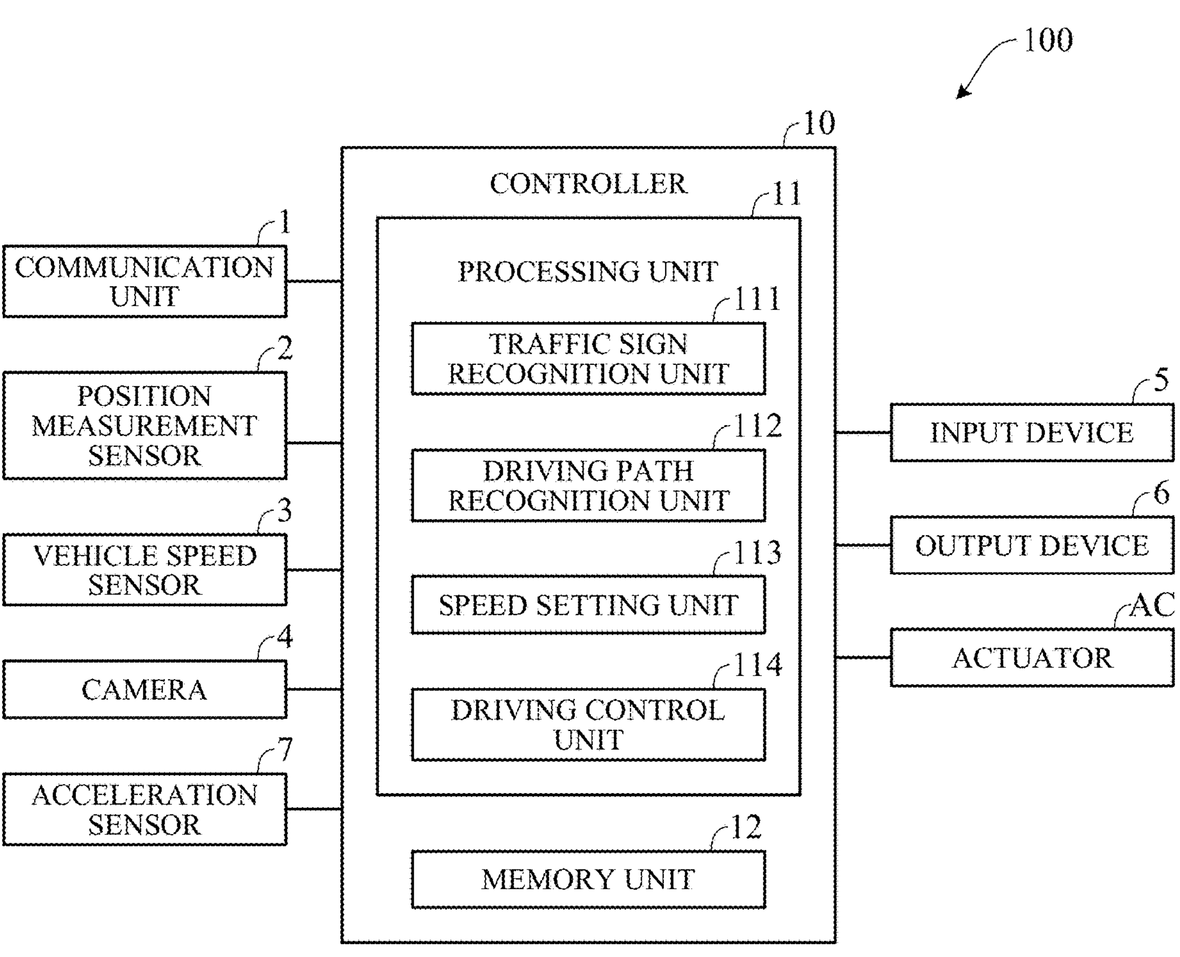
FIG. 1 is a block diagram schematically showing a configuration of main components of the vehicle control apparatus 100 according to the embodiment of the present invention.

FIG. 1 is a block diagram schematically showing a configuration of main components of the vehicle control apparatus 100 according to the embodiment of the present invention. As shown in FIG. 1, the vehicle control apparatus 100 includes a controller 10, a communication unit 1, a position measurement sensor 2, a vehicle speed sensor 3, a camera 4, an input device 5, an output device 6, an acceleration sensor 7, and an actuator AC. The communication unit 1, the position measurement sensor 2, the vehicle speed sensor 3, the camera 4, the input device 5, the output device 6, the acceleration sensor 7, and the actuator AC are communicatively connected to the controller 10, respectively.

The communication unit 1 communicates with various servers (not shown) through a network including a wireless communication network such as an Internet network or a cellular telephone network, and acquires map information, traffic information, and the like from a server periodically or at an arbitrary timing. The network includes not only a public wireless network, but also a closed communications network established for a predetermined administrative area, such as a wireless LAN, Wi-Fi (registered trademark), or Bluetooth (registered trademark). The acquired map information is output to the memory unit 12 (to be described later) and updated as needed.

The position measurement sensor 2 receives a signal for positioning transmitted from the positioning satellite. The positioning satellite is an artificial satellite such as a GPS satellite or a quasi-zenith satellite. Using the position information received by the position measurement sensor 2, the current traveling position of the subject vehicle 101 (latitude, longitude, altitude) is determined. The position measurement sensor 2 is used to determine the position of the subject vehicle 101. It is also possible to use a distance detection sensor (radar, LiDAR, etc.) determining the distance from the subject vehicle 101 to an object (object installed on the road) instead of the position measurement sensor 2 for measuring the current traveling position. In this case, based on the position information of the object installed on the road obtained from the map information stored in the memory unit 12 (to be described later) and the distance information to the object obtained by the position measurement sensor 2, the position of the subject vehicle 101 is determined. The position measurement sensor 2 may be used together with the distance detection sensor. The vehicle speed sensor 3 determines the travel speed of the subject vehicle 101. The acceleration sensor 7 determines acceleration in the left-right direction (lateral acceleration) of the subject vehicle 101. The acceleration sensor 7 may also determine acceleration in the front-back direction (longitudinal acceleration) and in the up-down direction (vertical acceleration) of the subject vehicle 101.

The camera 4 has an image sensor such as a CCD or a CMOS. The camera 4 may be a monocular camera or a stereo camera. The camera 4 captures a periphery of the subject vehicle 101. The camera 4 is, for example, attached to a predetermined position of the front portion of the subject vehicle 101. The camera 4 continuously captures the space ahead of the subject vehicle 101 to acquire image data (hereinafter, referred to as "captured image data" or simply "captured image") of the object.

The input device 5 is a generic name for a device for accepting input operations by the driver. For example, the input device 5 includes a button, a switch, a display with touch panel functions, etc., installed at predetermined locations in the vehicle (e.g., a steering wheel, a center console).

The output device 6 is a generic name of a device for outputting information to the driver. For example, the output device 6 includes a display, a speaker or the like, which is installed at the predetermined locations in the vehicle for providing information (image information or voice information) to the driver.

The actuator AC is a traveling actuator for controlling the traveling of the subject vehicle 101. If the travel drive source is a combustion engine, the actuator AC includes a throttle actuator that adjusts the opening of the throttle valve of the engine. If the travel drive source is an electric motor, the electric motor is included in the actuator AC. The actuator AC also includes a brake actuator for actuating a braking device of the subject vehicle 101 and a steering actuator for driving a steering device of the subject vehicle 101.

The controller 10 comprises an electronic control unit (ECU). More specifically, the controller 10 includes a computer having a processing unit 11 such as a central processing unit (microprocessor), a memory unit 12 such as ROM and RAM, and other peripheral circuits (not shown) such as an I/O interface. Although a plurality of ECUs having different functions, such as a combustion engine control ECU, an electric motor control ECU, and an ECU for the braking device, can be provided separately, the controller 10 is shown in FIG. 1 as a set of these ECUs for convenience.

The memory unit 12 stores high-precision detailed map information, which is referred to as high-precision map information. The high-precision map information includes position information of roads, information on the shapes of roads (curvature, etc.), information on the slopes of roads, position information of intersections and branching points, information on the number of lanes, and width of lanes, position information for each lane (information on the center position of lanes and the boundary line of lanes), position information of landmarks (traffic lights, buildings, etc.) on the map, information on road signs (position, type, regulatory information, etc.), information on road surface profiles such as unevenness of the road surface, etc. The memory unit 12 also stores various control programs, thresholds used in the programs, and other information.

The processing unit 11 includes a traffic sign recognition unit 111, a driving path recognition unit 112, a speed setting unit 113, and a driving control unit 114, as functional configurations. The traffic sign recognition unit 111 detects a road traffic sign included in an imaging range, specifically, a road traffic sign installed on a forward side in an advancing direction (on a far side in the advancing direction) in association with a driving path of the subject vehicle 101, based on a captured image that has been obtained by the camera 4. The traffic sign recognition unit 111 recognizes information about a road traffic sign that has been detected, for example, information about a type (a warning sign or a regulatory sign) or a content of the road traffic sign, a position in which the road traffic sign has been recognized (hereinafter, referred to as a recognized position), and the like, based on the captured image, and stores recognized information in the memory unit 12. The traffic sign recognition unit 111 may recognize the information of the road traffic sign installed on the forward side in the advancing direction in association with the driving path of the subject vehicle 101 from the map information stored in the memory unit 12.

The driving path recognition unit 112 recognizes the curvature of the driving path on the forward side in the advancing direction of the subject vehicle 101. Specifically, the driving path recognition unit 112 calculates the curvature of the driving path included in an imaging range, based on the captured image that has been obtained by the camera 4. Note that the driving path recognition unit 112 may calculate the curvature of the driving path, based on a yaw rate, a yaw angle, a pitch rate, a pitch angle, a roll rate, and a roll angle of the subject vehicle 101 during driving to be detected by an in-vehicle sensor, not illustrated, of the subject vehicle 101. In addition, the driving path recognition unit 112 may acquire the curvature of the driving path from the map information stored in the memory unit 12. Furthermore, the driving path recognition unit 112 may estimate the curvature of the driving path, based on lateral acceleration detected by the acceleration sensor 7 and the vehicle speed detected by the vehicle speed sensor 3. The driving path recognition unit 112 further recognizes a curved road based on the recognized curvature of the driving path.

Figure 2A:
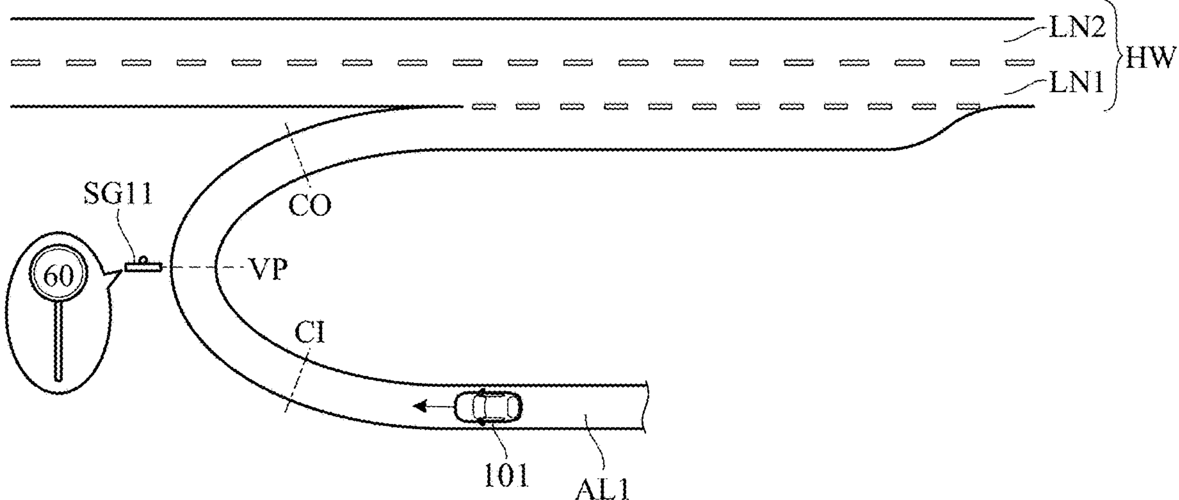
FIG. 2A is a diagram illustrating an example of a driving scene of a subject vehicle.
Figure 2B:
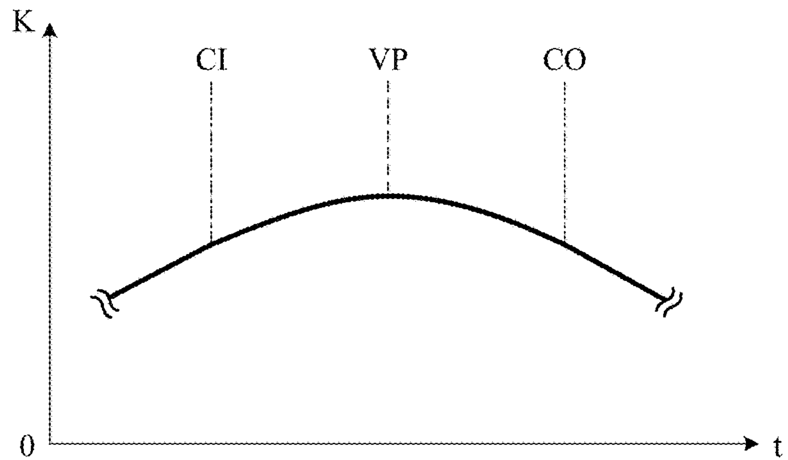
FIG. 2B is a graph illustrating a curvature of the merging lane in FIG. 2A.

FIG. 2A is a diagram illustrating an example of a driving scene of a subject vehicle 101. FIG. 2B is a graph illustrating a curvature K of the merging lane AL1 in FIG. 2A. FIG. 2A illustrates a scene in which the subject vehicle 101 travels on a lane AL1 (hereinafter, referred to as a merging lane) to merge into a highway HW with two lanes on each side. Lanes LN1 and LN2 of FIG. 2A are two lanes on the right side of the highway HW. The merging lane AL1 includes: a curved road in which the curvature changes to the maximum at a position VP; and a straight line (hereinafter, also referred to as an acceleration lane) provided to be adjacent to the lane LN1 on a forward side of the curved road (on the far side in the advancing direction). A road traffic sign (a speed limit sign) SG11 indicating that the maximum vehicle speed is limited to 60 km/h is installed on the curved road of the merging lane AL1.

The speed setting unit 113 sets a target driving speed of the subject vehicle 101 in a driving path including a merging lane and a highway as illustrated in FIG. 2A. While the subject vehicle 101 is traveling on the merging lane to merge into the highway, when the driving path recognition unit 112 recognizes a curved road and the traffic sign recognition unit 111 recognizes a speed limit sign on the curved road, the speed setting unit 113 recognizes that the speed limit sign that has been recognized by the traffic sign recognition unit 111 is applied to the subject vehicle 101, which is traveling in the merging lane (more specifically, a section from an installation position of the speed limit sign to an end position of the acceleration lane). That is, it is recognized that the maximum vehicle speed of the subject vehicle 101 is limited to the speed limit designated by the speed limit sign, after the subject vehicle 101 passes by the speed limit sign until the subject vehicle 101 enters the highway. Then, the speed setting unit 113 sets the target driving speed of the subject vehicle 101 to the speed limit (hereinafter, referred to as a speed V1) designated by the speed limit sign. Then, when the curvature K of the driving path that has been recognized by the driving path recognition unit 112 becomes smaller than the predetermined value, the speed setting unit 113 determines that the subject vehicle 101 has entered the acceleration lane on the forward side of the curved road in the merging lane, that is the subject vehicle 101 will enters the main lane soon, and sets the target driving speed of the subject vehicle 101 to a speed V2, which is different from the speed V1. The speed V2 is a target driving speed that has been input via the input device by the user, when the user uses a self-driving capability (or a driving support function) such as constant speed driving. The memory unit 12 stores information indicating the speed V2 (hereinafter, referred to as set speed information). In a case where the target driving speed has not been input by the user, the speed setting unit 113 may acquire the speed limit designated by the speed limit sign as the speed V2, based on the speed limit sign that has been recognized by the traffic sign recognition unit 111, after the subject vehicle 101 enters the acceleration lane. The speed limit may be taken from the map information stored in the memory unit 12, or a highway default limit may be applied.

Figure 3:
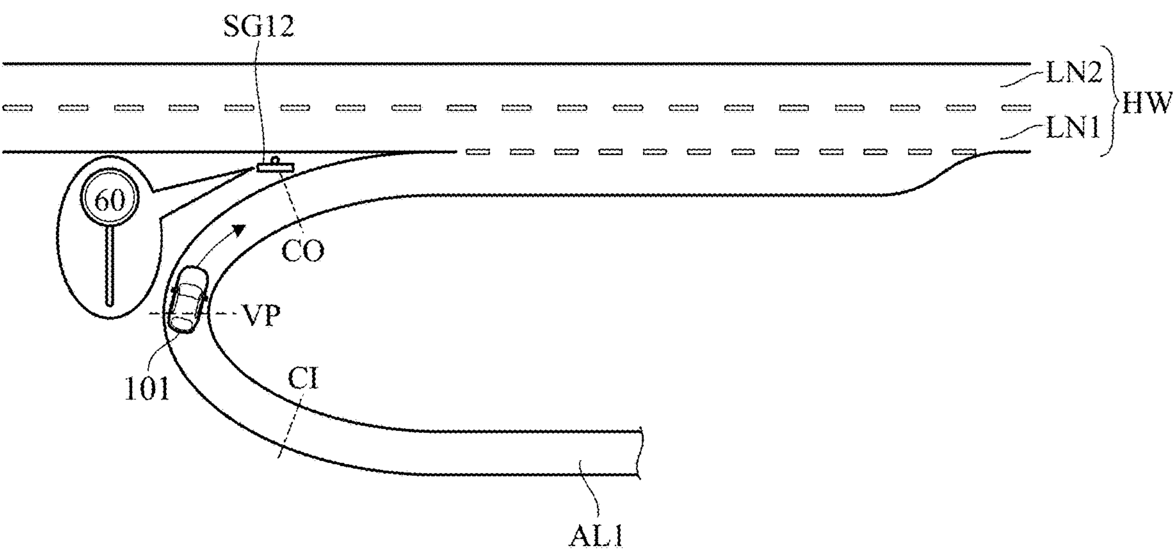
FIG. 3 is a diagram illustrating another example of the driving scene of the subject vehicle.

FIGS. 3, 4A, 4B, 5A, and 5B are diagrams illustrating other examples of the driving scene of the subject vehicle 101. The driving scene of FIG. 3 is similar to the driving scene of FIG. 2A. However, a speed limit sign SG2 is provided in the vicinity of an end position of the curved road, that is, in the vicinity of a start position of the acceleration lane. When the traffic sign recognition unit 111 recognizes the speed limit sign installed at the start position of the acceleration lane or within a predetermined distance in the advancing direction from the start position, the speed setting unit 113 recognizes that the speed limit sign is applied to not only the subject vehicle 101 traveling in the merging lane but also the subject vehicle 101 after entering the highway. That is, it is recognized that the maximum vehicle speed of the subject vehicle 101 is limited to the speed limit designated by the speed limit sign, not only after the subject vehicle 101 passes by the speed limit sign until the subject vehicle 101 enters the highway but also after the subject vehicle 101 enters the highway.

Figure 4A:
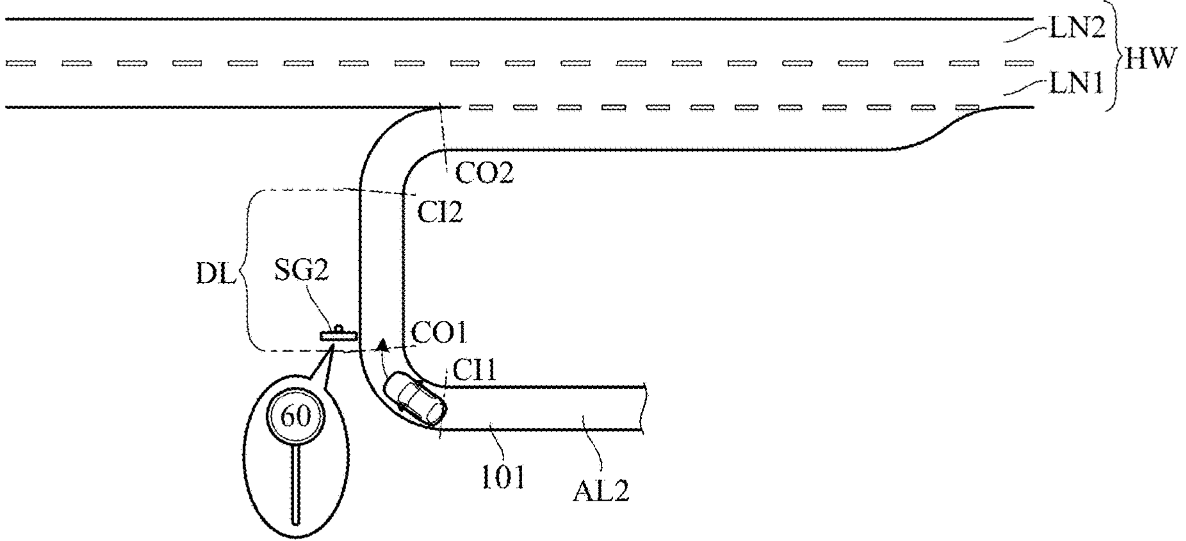
FIG. 4A is a diagram illustrating another example of the driving scene of the subject vehicle.
Figure 4B:
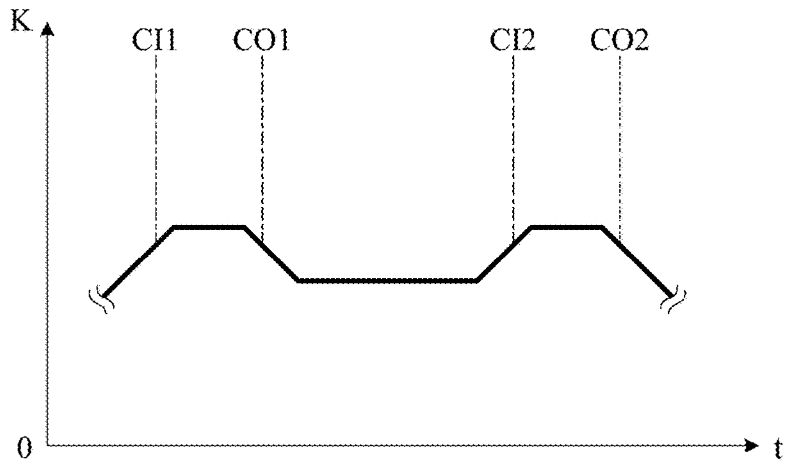
FIG. 4B is a graph illustrating the curvature of the merging lane in FIG. 4A.

FIG. 4A illustrates a scene in which the subject vehicle 101 travels in a merging lane AL2 including a first curved road (a section CI1 to CO1) and a second curved road (a section CI2 to CO2). FIG. 4B is a graph illustrating a change rate of the curvature K of the merging lane AL2 in FIG. 4A.

Like the merging lane AL2 illustrated in FIG. 4A, in a case where a straight line DL (a section CO1 to CI2) in which the curvature K is smaller than a predetermined value is included, the speed setting unit 113 erroneously recognizes the straight line DL as an acceleration lane, in some cases. In such cases, the speed setting unit 113 may erroneously determine that the speed limit sign SG2 is installed in the vicinity of the start position of the acceleration lane. As a result, although the speed limit sign SG2 is to be applied only to the subject vehicle 101 traveling in the merging lane AL2, the speed limit sign SG2 may also be applied to the subject vehicle 101 after entering the highway HW similarly to the driving scene of FIG. 3.

Hence, in a case where a state, in which the curvature K of the driving path on the forward side in the advancing direction that has been recognized by the driving path recognition unit 112 is smaller than a predetermined value, continues for a predetermined distance, the speed setting unit 113 determines that the subject vehicle 101 has entered the acceleration lane. The above predetermined distance is set to a value larger than the length of the straight line DL so that a section in which the curvature K is smaller than the predetermined value like the straight line DL should not be erroneously recognized as the acceleration lane. Note that in a case where the state, in which the curvature K of the driving path on the forward side in the advancing direction is smaller than the predetermined value, continues for a predetermined period, the speed setting unit 113 may determine that the subject vehicle 101 has entered the acceleration lane. In addition, such a predetermined period may be changed in accordance with the current driving speed of the subject vehicle 101.

Note that the driving path recognition unit 112 may acquire the curvature of the merging lane from the map information stored in the memory unit 12 and recognize an end position of the curved road included in the merging lane, based on the curvature K, and the speed setting unit 113 may determine whether the subject vehicle 101 has entered the acceleration lane, based on such an end position. For example, the speed setting unit 113 determines that the subject vehicle 101 has entered the acceleration lane when the vehicle 101 passes the end position. Note that like the example of FIG. 4A, in a case where the merging lane AL2 includes a plurality of curved roads, the driving path recognition unit 112 recognizes an end position of the curve road on the farthest side in the advancing direction. When determining that the subject vehicle 101 has entered the acceleration lane, the speed setting unit 113 switches the target driving speed of the subject vehicle 101 from the speed V1 to the speed V2.

Figure 5A:
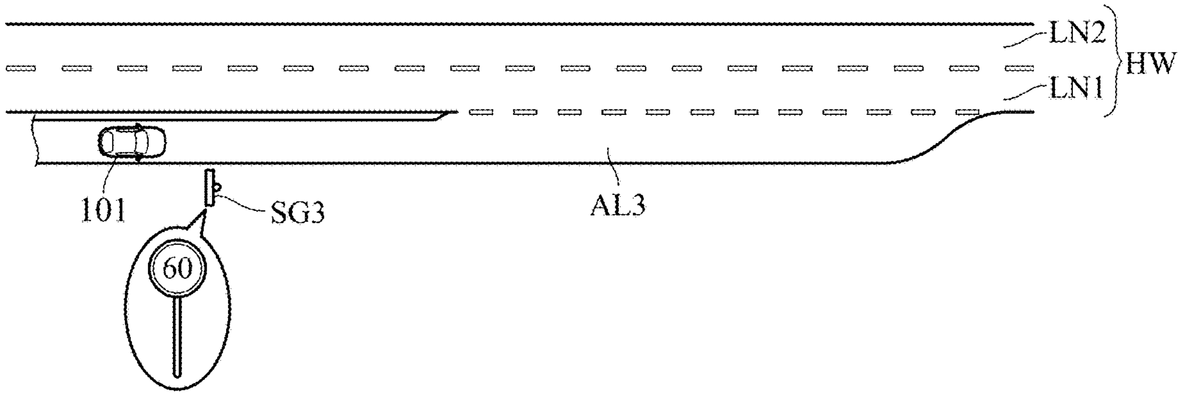
FIG. 5A is a diagram illustrating another example of the driving scene of the subject vehicle.
Figure 5B:
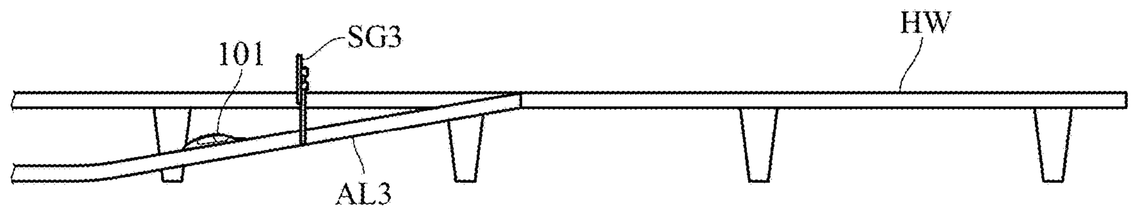
FIG. 5B is a diagram illustrating another example of the driving scene of the subject vehicle.

FIG. 5A illustrates a bird's-eye view of a three-dimensional road where a merging lane AL3 merges into the highway HW, and FIG. 5B schematically illustrates a view of the three-dimensional road of FIG. 5A, when viewed from a right side (a lower side of FIG. 5A). As described above, a speed limit sign SG3 installed in the vicinity of the start position of the acceleration lane is usually applied to not only the subject vehicle 101 traveling in the merging lane AL3 but also the subject vehicle 101 after entering the highway HW. However, in a case where the acceleration lane is an inclined road as illustrated in FIG. 5B, the speed limit sign SG3 installed in the acceleration lane is applied to the subject vehicle 101 traveling in the acceleration lane, but is not applied to the subject vehicle 101 after entering the highway HW. Therefore, when the driving path recognition unit 112 recognizes the speed limit sign in the vicinity of the start position of the acceleration lane, the speed setting unit 113 determines whether the acceleration lane is an inclined road. In a case of determining that the acceleration lane is the inclined road, the speed setting unit 113 recognizes that the speed limit sign is applied to the subject vehicle 101 traveling in the merging lane, but is not applied to the subject vehicle 101 after entering the highway. Note that in a case where the gradient of the acceleration lane is equal to or larger than a predetermined threshold, the speed setting unit 113 recognizes that the acceleration lane is the inclined road. The gradient of the acceleration lane is recognized by the driving path recognition unit 112, based on the captured image by the camera 4 or the map information stored in the memory unit 12.

The driving control unit 114 conducts driving speed control of the subject vehicle 101, based on the target driving speed that has been set by the speed setting unit 113. Specifically, the driving control unit 114 controls an actuator AC so that the subject vehicle 101 travels at the target driving speed that has been set by the speed setting unit 113.

Figure 6:
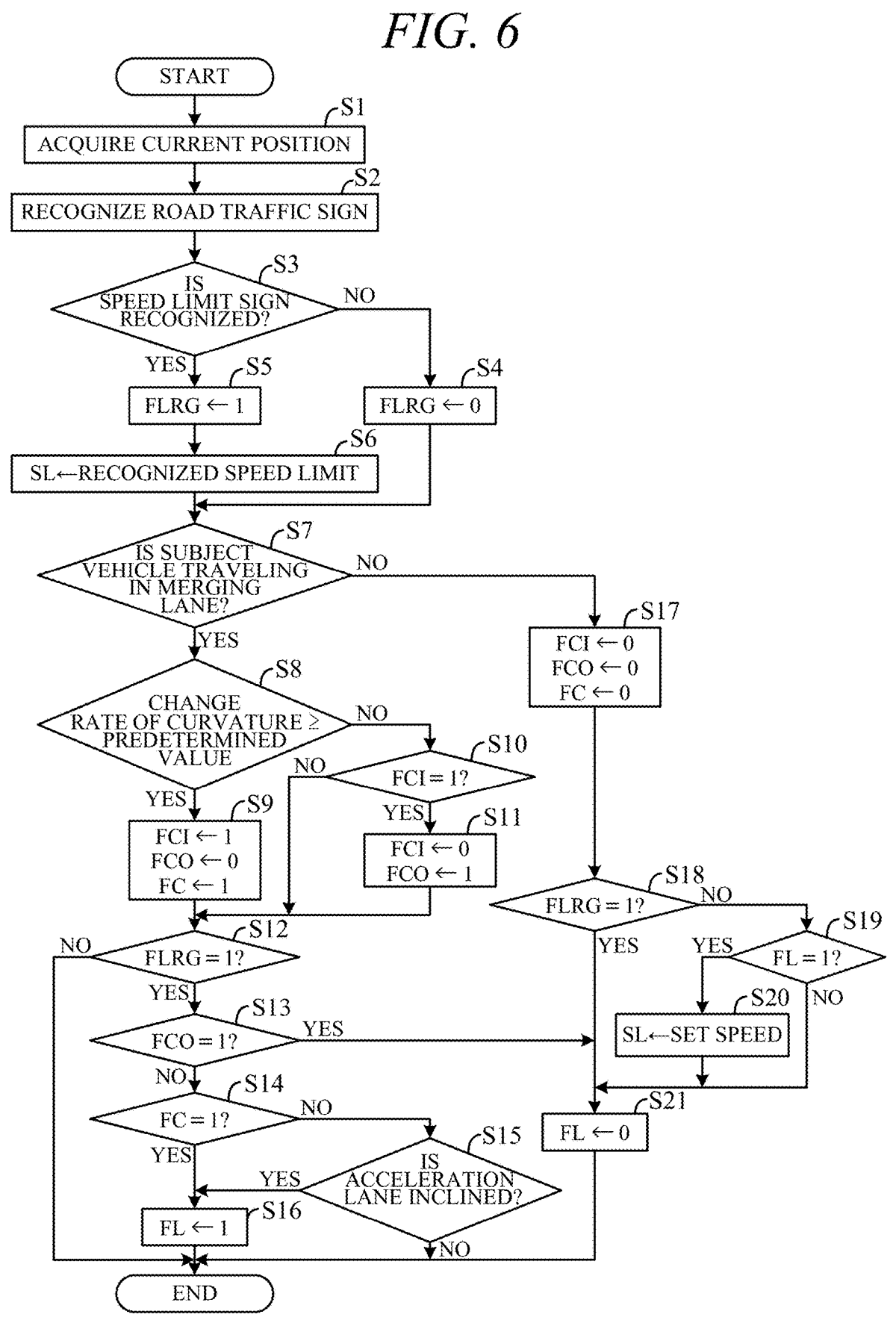

FIG. 6 is a flowchart illustrating an example of processing performed by the controller 10 in FIG. 1. The processing illustrated in the flowchart is repeated, for example, at a predetermined cycle, while the subject vehicle 101 is traveling in a self-drive mode.

As illustrated in FIG. 6, first, in step S1, the current position (currently traveling position) of the subject vehicle 101 is acquired, based on position measurement information that has been received by the position measurement sensor 2 and the map information stored in the memory unit 12. In step S2, recognition processing of a road traffic sign is performed, based on a captured image by the camera 4 or the map information stored in the memory unit 12. In step S3, it is determined whether a speed limit sign is recognized in step S2. In a case where a positive determination is made in step S3, a flag FLRG is set to 1 in step S5. The flag FLRG is information indicating whether the speed limit sign has been recognized with 1 (TRUE) and 0 (FALSE), and is stored in the memory unit 12. In step S6, the target driving speed is set to the speed limit (the speed V1) designated by the speed limit sign recognized in step S2. Specifically, speed limit information SL is updated with the speed V1. The speed limit information SL is information indicating the target driving speed of the subject vehicle 101, and is stored in the memory unit 12. On the other hand, in a case where a negative determination is made in step S3, the flag FLRG is set to 0 in step S4, and the processing proceeds to step S7.

In step S7, it is determined whether the subject vehicle 101 is traveling in a merging lane. In a case where a positive determination is made in step S7, it is determined in step S8 whether a curvature of the driving path on a forward side in the advancing direction is equal to or larger than a predetermined value, based on a captured image by the camera 4 or the map information stored in the memory unit 12. In a case where a positive determination is made in step S8, in step S9, a flag FCI is set to 1, a flag FCO is set to 0, and a flag FC is set to 1. The flag FCI is information indicating whether the subject vehicle 101 has passed the start position of the curved road (e.g., the point CI in FIG. 3) with 1 (TRUE) and 0 (FALSE). The flag FCO is information indicating whether the subject vehicle 101 has passed the end position of the curved road (e.g., the point CO in FIG. 3) with 1 (TRUE) and 0 (FALSE). The flag FC is information indicating whether the subject vehicle 101 has passed the curved road with 1 (TRUE) and 0 (FALSE). The flags FCI, FCO and FC are stored in the memory unit 12 and initialized to 0 beforehand. In a case where a negative determination is made in step S8, it is determined in step S10 whether the flag FCI is set to 1, that is, whether the subject vehicle 101 has passed the start position of the curved road. In a case where a negative determination is made in step S10, it is determined that the subject vehicle 101 is traveling on a straight line (including a straight line between the curved roads such as straight line DL in FIG. 4A), and the processing proceeds to step S12. In a case where a positive determination is made in step S10, it is determined that the subject vehicle 101 has passed of the end position of the curved road after passing the start position of the curved road, and the flag FCO is set to 1 in step S11. At this time, the flag FCI is initialized to 0. In step S12, it is determined whether the flag FLRG is 1. In a case where a negative determination is made in step S12, the processing ends. In a case where a positive determination is made in step S12, in step S13, it is determined whether the flag FCO is 1. In a case where a positive determination is made in step S13, it is determined that the vehicle 101 has recognized the speed limit sign at the end position of the curved road or on the straight line (acceleration lane) beyond the curved road, and the flag FL is set to 0 in step S21. On the other hand, in a case where a negative determination is made in step S13, it is determined whether the flag FC is 1 in step S14. In a case where a positive determination is made in step S14, it is determined that the speed limit sign has been recognized while the vehicle 101 is traveling on the curved road, and a flag FL is set to 1 in step S16, and the processing ends. The flag FL is information for adjusting a timing of switching the setting of the target driving speed of the subject vehicle 101 from the speed V1 to the speed V2. In a case where the flag FL is set to 1 (TRUE), the driving speed control based on the speed V1 is conducted until the subject vehicle 101 enters the main lane (highway). When the subject vehicle 101 enters the main lane, the target driving speed of the subject vehicle 101 is switched from the speed V1 to the speed V2, and the driving speed control based on the speed V2 is started. On the other hand, in a case where the flag FL is set to 0 (FALSE), the driving speed control based on the speed V1 is continued, also after the subject vehicle 101 enters the main lane (the highway). On the other hand, in a case where a negative determination is made in step S14, that is, in a case where the speed limit sign has been recognized while the subject vehicle 101 has never passed the curve road, it is determined in step S15 whether the lane in which the subject vehicle 101 is traveling is inclined. In a case where a positive determination is made in step S15, it is determined that the speed limit sign has been recognized while the subject vehicle 101 is traveling in an inclined acceleration lane as shown in FIGS. 5A and 5B, the processing proceeds to step S16, the flag FL is set to 1, and the processing ends. On the other hand, in a case where a negative determination is made in step S15, the process ends. Accordingly, when the speed limit sign is recognized in the acceleration lane, and in a case where the acceleration lane is an inclined road, the speed limit sign is applied only to the subject vehicle 101 traveling in the acceleration lane. On the other hand, in a case where the acceleration lane is not the inclined road, the speed limit sign is applied to not only the subject vehicle 101 traveling in the acceleration lane but also the subject vehicle traveling on a highway. Note that the flag FL is initialized to 0 beforehand.

In a case where a negative determination is made in step S7, that is, in a case where it is determined that the subject vehicle 101 is traveling in the main lane (the highway), the flags FCI, FCO, and FC are initialized to 0 in step S17. It is determined in step S18 whether the flag FLRG is 1. In a case where a positive determination is made in step S18, that is, when the speed limit sign is recognized while the subject vehicle 101 is traveling in the main lane, the processing proceeds to step S21, the flag FL is set to 0, and the processing ends. In a case where a negative determination is made in step S18, it is determined in step S19 whether the flag FL is 1. In a case where a negative determination is made in step S19, the processing proceeds to step S21. In a case where a positive determination is made in step S19, the speed limit information SL is updated with the speed V2 in step S20, and then the processing proceeds to step S21. In this manner, in a case where the flag FL is set to 1, and when the subject vehicle 101 enters the main lane, the target driving speed of the subject vehicle 101 is switched from the speed V1 to the speed V2. In the determination of step S7, when the curvature of the driving path on the forward side in the advancing direction remains below a predetermined value for a predetermined distance or for a predetermined period, the vehicle 101 traveling in the acceleration lane may be determined to be entering the main lane (highway) soon and the processing proceeds to step S17. As a result, while the vehicle 101 is traveling in the acceleration lane, the target driving speed of the vehicle 101 is switched from the speed V1 to the speed V2, and the vehicle 101 can smoothly enter the main lane.

The driving control unit 114 controls the actuator AC, based on the speed limit information SL to be updated by the processing of FIG. 6 being repeatedly performed. More specifically, the driving control unit 114 controls the actuator AC so that the vehicle speed detected by the vehicle speed sensor 3 does not exceed the target driving speed indicated by the speed limit information SL.

The operation of the vehicle control apparatus 100 according to the present embodiment will be summarized as follows. In the driving scene of FIG. 2A, when the road traffic sign SG11 installed on the driving path on the forward side in the advancing direction is recognized, the speed limit information SL is updated with the speed limit (the speed V1) designated by the road traffic sign SG11 (S1 to S3, S5, S6). In this case, the vehicle control apparatus 100 determines that the speed limit sign is applied only to the subject vehicle 101 traveling in the merging lane (S7, S8, S9, S12, S13, S14, S16). While the curvature of the driving path on the forward side in the advancing direction is equal to or larger than a predetermined value, that is, while the subject vehicle 101 is traveling on a curved road, the driving speed control based on the speed V1 is continued (S1 to S4, S7, S8, S9, S12). Then, when the subject vehicle 101 enters the main lane, and the speed limit information SL is updated with the speed V2 indicated by the set speed information stored in the memory unit 12 (S1 to S4, S7, S17, S18, S19, S20, S21). Accordingly, the subject vehicle 101 travels at the speed limit (the speed V1) designated by the road traffic sign SG11 until the subject vehicle 101 enters the main lane, and after entering the main lane, the subject vehicle 101 travels in accordance with the target driving speed (the speed V2) that has been instructed beforehand by the user.

On the other hand, in the driving scene of FIG. 4A, when the speed limit sign SG2 installed on the straight line DL between the first curved road and the second curved road in the merging lane AL2 is recognized, the speed limit information SL is updated with the speed limit (the speed V1) designated by the speed limit sign SG2 (S1 to S3, S5, S6). In the driving scene of FIG. 4A, the straight line DL is recognized on the forward side in the advancing direction of the subject vehicle 101, but the second curved road is present on the forward side of the straight line DL. Hence, the vehicle control apparatus 100 determines that the straight line DL is not the acceleration lane, and determines that the speed limit sign SG2 is applied only to the subject vehicle 101 traveling in the merging lane (S7, S8, S9, S10, S12, S13, S14, S16). As a result, the vehicle control apparatus 100 continues the driving speed control based on the speed V1. Then, when the subject vehicle 101 has passed the second curved road and enters the main lane, the speed limit information SL is updated with the speed V2 (S1 to S4, S7, S17, S18, S19, S20, S21).

In addition, in the driving scene of FIG. 3, when the speed limit sign SG12 installed in the vicinity of the start position of the acceleration lane in the merging lane AL1 is recognized, the speed limit information SL is updated with the speed limit (the speed V1) designated by the speed limit sign SG12 (S1 to S3, S5, S6). The acceleration lane of the merging lane AL1 is not inclined, and therefore the vehicle control apparatus 100 determines that the speed limit sign SG12 is applied to not only the subject vehicle 101 traveling in the merging lane AL1 but also the subject vehicle 101 after entering the highway HW (S7, S8, S10, S11, S12, S13, S21). As a result, the driving speed control based on the speed V1 is continued, also after the vehicle enters the highway HW (S1 to S4, S7, S17, S18, S19, S21). On the other hand, in the driving scene of FIG. 5A, when the speed limit sign SG3 installed in the acceleration lane (the inclined road) in the merging lane AL3 is recognized, the vehicle control apparatus 100 determines that the speed limit sign SG3 is applied to the subject vehicle 101 traveling in the acceleration lane, but is not applied to the subject vehicle 101 after entering the highway HW (S1 to S3, S5, S6, S7, S8, S10, S12, S13, S14, S15, S16). As a result, the driving speed control based on the speed limit (the speed V1) designated by the speed limit sign SG3 is continued until the subject vehicle 101 enters the highway HW. When the subject vehicle 101 enters the highway HW, the target driving speed is switched from the speed V1 to the speed V2, and the driving speed control based on the speed V2 is started (S1 to S4, S7, S17, S18, S19, S20, S21).

According to the present embodiment, the following operations and effects are achievable.

(1) The vehicle control apparatus 100 includes: the traffic sign recognition unit 111, which recognizes a road traffic sign installed on a forward side in an advancing direction in association with a driving path of the subject vehicle 101; the driving path recognition unit 112, which recognizes a curvature of the driving path on the forward side in the advancing direction; the speed setting unit 113, which sets a target driving speed of the subject vehicle 101 on the driving path; the actuator AC; and the driving control unit 114, which controls the actuator AC for the subject vehicle 101 to travel at the target driving speed that has been set by the speed setting unit 113. The driving path recognition unit 112 further recognizes a curved road based on the curvature of the driving path. While the subject vehicle 101 is traveling in a merging lane to merge into a main lane (a highway), when the driving path recognition unit 112 recognizes the curved road and the traffic sign recognition unit 111 recognizes the road traffic sign on the curved road, the speed setting unit 113 sets the target driving speed to the first target driving speed (the speed V1) based on the road traffic sign. Then, when the subject vehicle 101 enters the main lane the speed setting unit 113 sets the target driving speed to the second target driving speed (the speed V2) different from the speed V1. Accordingly, also in a case where the merging lane includes a curved road, it becomes possible to satisfactorily enter the main lane from the merging lane in accordance with the speed limit sign installed in the merging lane. As a result, the safety of traffic in the vicinity of a merging point can be improved.

(2) After the driving path recognition unit 112 recognize the curved road, when a state in which the curvature that is smaller than the predetermined value continues for a predetermined period or a predetermined distance, the driving path recognition unit 112 determines that the subject vehicle 101 is traveling in the acceleration lane, that is, the subject vehicle 101 will enter the main lane soon, and changes the target driving speed from the speed V1 to the speed V2. Accordingly, when the subject vehicle 101 enters the acceleration lane, the driving speed control based on the speed limit sign installed in the merging lane can be suppressed. In addition, like the merging lane AL2 illustrated in FIG. 4A, in the straight line DL included in the curved road (the section CI1 to CO2), it is possible to prevent the driving speed control based on the speed limit sign installed in the merging lane from being suppressed.

(3) The driving path recognition unit 112 further recognizes a gradient of the driving path on the forward side in the advancing direction. While the subject vehicle 101 is traveling in the merging lane, when the traffic sign recognition unit 111 recognizes a road traffic sign, the speed setting unit 113 determines whether the gradient of the driving path that has been recognized by the driving path recognition unit 112 is equal to or larger than a predetermined threshold. In a case where it is determined that the gradient is equal to or larger than the predetermined threshold, the speed setting unit changes the target driving speed from the speed V1 to the speed V2. Accordingly, as illustrated in FIG. 5A, also in the merging lane in which the acceleration lane is the inclined road, the driving speed of the subject vehicle 101 can be appropriately controlled in accordance with the speed limit sign installed in the merging lane.

The above embodiments can be modified into various forms. Hereinafter, some modifications will be described. In the above embodiments, the situation in the surroundings (on the forward side) of the subject vehicle 101 is detected by the camera 4 as an imaging unit. However, an in-vehicle detection unit may have any configuration, as long as the situation in the surroundings of the subject vehicle 101 is detected. For example, the in-vehicle detection unit may be a radar or a LiDAR. In addition, in the above embodiments, the traffic sign or the like included in the image that has been captured by the camera 4 is detected. However, the traffic sign recognition unit may detect the traffic sign or the like, based on information that has been obtained by a radar or a LiDAR.

Figure 7:
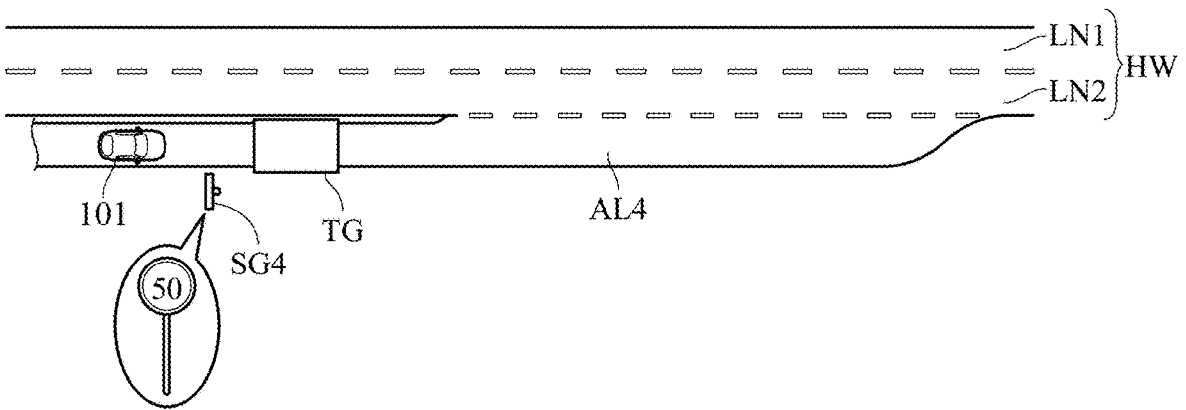
FIG. 7 is a diagram illustrating another example of the driving scene of the subject vehicle.

In the above embodiments, the driving path recognition unit 112 is configured to recognize the curvature and the gradient of the driving path on the forward side in the advancing direction. However, the driving path recognition unit may recognize a tollgate installed on the driving path on the forward side in the advancing direction, based on the captured image by the camera 4 or the map information stored in the memory unit 12 and the position of the subject vehicle 101 that has been detected by the position measurement sensor 2. FIG. 7 is a diagram illustrating another example of the driving scene of the subject vehicle 101. In FIG. 7, a tollgate TG is provided in a merging lane AL4, and a speed limit sign SG4 is installed on a near side in the advancing direction of the tollgate TG. In the driving scene of FIG. 7, when the traffic sign recognition unit 111 recognizes the speed limit sign SG4, the speed setting unit 113 determines whether the driving path recognition unit 112 has recognized the tollgate TG on the driving path on the forward side in the advancing direction. When the tollgate TG is recognized on the driving path on the forward side in the advancing direction, the speed setting unit 113 recognizes that the speed limit sign SG4 is applied to the subject vehicle 101 before passing through the tollgate TG, but is not applied to the subject vehicle 101 after passing through the tollgate TG. Then, the speed setting unit 113 sets the target driving speed to the speed limit (the speed V1) designated by the speed limit sign SG4 until the subject vehicle 101 passes through the tollgate TG, and changes the target driving speed from the speed V1 to the speed V2 after the subject vehicle 101 passes through the tollgate TG.

In addition, in the above embodiments, in the driving scene as illustrated in FIG. 2A, when the subject vehicle 101 enters the acceleration lane, the speed setting unit 113 is configured to set the target driving speed to the speed V2 indicated by the set speed information stored in the memory unit 12. Further, in a case where the set speed information is not stored in the memory unit 12, the speed setting unit 113 is configured to acquire, as the speed V2, the speed limit designated by the speed limit sign, based on the speed limit sign that has been recognized by the traffic sign recognition unit 111, after the subject vehicle 101 enters the acceleration lane. However, in some cases, because of occlusion or the like by a forward vehicle, the traffic sign recognition unit 111 is not capable of recognizing the speed limit sign that is associated with the driving path on the forward side in the advancing direction of the subject vehicle 101 from the captured image by the camera 4. In such cases, the speed setting unit 113 is not capable of acquiring information of the speed V2, and is not capable of satisfactorily switching the target driving speed. Hence, the speed setting unit may output, to the output device 6, request information (voice information or image information) for requesting an input of a command value of the speed V2, and may acquire the command value of the speed V2, which has been input by the user via the input device 5 in response to the request. More specifically, while the subject vehicle 101 is traveling in the merging lane, in a case where a state, in which the curvature of the driving path that has been recognized by the driving path recognition unit 112 is smaller than a predetermined value, continues for a predetermined period or a predetermined distance, and in a case where the traffic sign recognition unit 111 does not recognize a new road traffic sign, the speed setting unit outputs the above request information via the output device 6. When the command value of the speed V2 is input by the user via the input device 5 in response to the output of the request information, the speed setting unit changes the target driving speed from the speed V1 to the speed V2 based on the command value. Accordingly, also when the set speed information is not stored in the memory unit 12, the driving speed control in the acceleration lane can be appropriately conducted. Note that in the case where the state, in which the curvature of the driving path that has been recognized by the driving path recognition unit 112 is smaller than the predetermined value, continues for the predetermined period or the predetermined distance, and in the case where the traffic sign recognition unit 111 does not recognize the new road traffic sign, the speed setting unit may acquire information of the speed limit sign that is associated with the driving path on the forward side in the advancing direction of the subject vehicle 101 from the map information stored in the memory unit 12, instead of requesting the input of the command value of the speed V2, and may acquire, as the speed V2, the speed limit designated by the speed limit sign. Alternatively, information of a legal speed limit that is set on the driving path on the forward side in the advancing direction of the subject vehicle 101 may be acquired from the map information stored in the memory unit 12, and the legal speed limit may be acquired as the speed V2.

Further, in the above embodiment, the vehicle control apparatus 100 is applied to the automated vehicle, but the vehicle control apparatus 100 is also applicable to vehicles other than the automated vehicle. For example, the vehicle control apparatus 100 can be applied to a manually operated vehicle including ADAS (Advanced Driver Assistance system).

Furthermore, in the above embodiment, an example has been shown in which the processing of FIG. 6 is executed while the subject vehicle 101 is traveling in the automated mode, but the processing of FIG. 6 may be executed while the subject vehicle 101 is traveling in the manual drive mode. In that case, the output device 6 serving as a notification unit is controlled together with the actuator AC or in place of the actuator AC by the driving control unit 114 based on the speed limit information SL which is updated by the processing of FIG. 6, which is repeatedly executed. Incidentally, the output device 6 serving as the notification unit may be controlled together with the actuator AC while the subject vehicle 101 is traveling in the automated mode. That is, a control unit may control at least one of the notification unit and the travel actuator based on the road sign. For example, the control unit controls the output device 6 (display) such that the speed limit indicated by the speed limit information SL is informed to the occupant in an image. Further, for example, the control unit controls the output device 6 (speaker) such that the speed limit indicated by the speed limit information SL is notified to the occupant in voice.

The above embodiment can be combined as desired with one or more of the above modifications.

According to the present invention, it is possible to appropriately control the travel speed of the vehicle traveling in the vicinity of the merging point.

The modifications can also be combined with one another. Above, while the present invention has been described with reference to the preferred embodiments thereof, it will be understood, by those skilled in the art, that various changes and modifications may be made thereto without departing from the scope of the appended claims.

What is claimed is:

1. A vehicle control apparatus comprising:

an actuator used for traveling; and a microprocessor, wherein the microprocessor is configured to perform:

recognizing a road traffic sign installed on a forward side in an advancing direction in association with a driving path of a subject vehicle, and a curvature of the driving path on the forward side in the advancing direction;

setting a target driving speed of the subject vehicle on the driving path; and controlling the actuator for the subject vehicle to travel at the target driving speed, wherein the microprocessor is configured to perform:

the recognizing including further recognizing a curved road based on the curvature of the driving path; and the setting including:

when the curved road and the road traffic sign on the curved road are recognized while the subject vehicle is traveling in a merging lane to merge into a main lane, setting the target driving speed to a first target driving speed which is based on the road traffic sign;

determining that the subject vehicle enters the main lane when a state in which the curvature is smaller than a predetermined value continues for a predetermined period or a predetermined distance after the curved road has been recognized; and changing the target driving speed from the first target driving speed to a second target driving speed different from the first target driving speed.

2. The vehicle control apparatus according to claim 1, wherein the microprocessor is configured to perform:

the recognizing including further recognizing a tollgate installed on the driving path; and the setting including, when the road traffic sign is recognized while the subject vehicle is traveling in the merging lane, setting the target driving speed to the first target driving speed, determining whether the tollgate is recognized, and when determining that the tollgate is recognized, changing the target driving speed from the first target driving speed to the second target driving speed when the subject vehicle passes the tollgate.

3. The vehicle control apparatus according to claim 1, further comprising:

an input device configured to input a command from a user; and an output device configured to output request information for requesting an input of a command value of the second target driving speed, wherein the microprocessor is configured to perform:

the setting including outputting the request information via the output device, when a state, in which the curvature is smaller than a predetermined value, continues for a predetermined period or a predetermined distance and a new road traffic sign is not recognized while the subject vehicle is traveling in the merging lane, and changing, when the command value of the second target driving speed is input to the input device in response to the outputting the request information, the target driving speed from the first target driving speed to the second target driving speed which is based on the command value.

4. The vehicle control apparatus according to claim 1, further comprising:

a memory coupled to the microprocessor and configured to store map information, wherein the microprocessor is configured to perform:

the setting including, when a state, in which the curvature is smaller than a predetermined value, continues for a predetermined period or a predetermined distance and a new road traffic sign is not recognized while the subject vehicle is traveling in the merging lane, setting the target driving speed from the first target driving speed to the second target driving speed acquired based on the map information stored in the memory.

5. A vehicle control apparatus comprising:

an actuator used for traveling; and a microprocessor, wherein the microprocessor is configured to perform:

recognizing a road traffic sign installed on a forward side in an advancing direction in association with a driving path of a subject vehicle, and a curvature of the driving path on the forward side in the advancing direction;

setting a target driving speed of the subject vehicle on the driving path; and controlling the actuator for the subject vehicle to travel at the target driving speed, wherein the microprocessor is configured to perform:

the recognizing including further recognizing a curved road based on the curvature of the driving path; and the setting including:

when the curved road and the road traffic sign on the curved road are recognized while the subject vehicle is traveling in a merging lane to merge into a main lane, setting the target driving speed to a first target driving speed which is based on the road traffic sign;

determining that the subject vehicle enters the main lane when the subject vehicle passes an end position of the curved road after the curved road has been recognized, and changing the target driving speed from the first target driving speed to a second target driving speed; and in a case where a plurality of curved roads is recognized, determining that the subject vehicle enters the main lane when the subject vehicle passes the end position of the curved road on a farthest side in the advancing direction, and changing the target driving speed from the first target driving speed to the second target driving speed.

6. A vehicle control apparatus comprising:

an actuator used for traveling; and a microprocessor, wherein the microprocessor is configured to perform:

recognizing a road traffic sign installed on a forward side in an advancing direction in association with a driving path of a subject vehicle, and a curvature of the driving path on the forward side in the advancing direction;

setting a target driving speed of the subject vehicle on the driving path; and controlling the actuator for the subject vehicle to travel at the target driving speed, wherein the microprocessor is configured to perform:

the recognizing including further recognizing a curved road based on the curvature of the driving path; and the setting including, when the curved road and the road traffic sign on the curved road are recognized while the subject vehicle is traveling in a merging lane to merge into a main lane, setting the target driving speed to a first target driving speed which is based on the road traffic sign, and setting, when the subject vehicle enters the main lane, the target driving speed to a second target driving speed different from the first target driving speed, wherein the microprocessor is configured to perform:

the recognizing including further recognizing a gradient of the driving path; and the setting including, when the road traffic sign is recognized while the subject vehicle is traveling in the merging lane, setting the target driving speed to the first target driving speed, determining whether the gradient of the driving path is equal to or larger than a predetermined threshold, and when determining that the gradient is equal to or larger than the predetermined threshold, changing the target driving speed from the first target driving speed to the second target driving speed when the subject vehicle enters the main lane.

* * * * *